INVENTOR.
WILLIAM M. GOLDBERGER
BY GRAY, MASE & DUNSON
ATTORNEYS

INVENTOR.
WILLIAM M. GOLDBERGER
BY GRAY, MASE & DUNSON
ATTORNEYS

United States Patent Office 3,461,679
Patented Aug. 19, 1969

3,461,679
SEPARATING LIQUEFIABLE MATERIALS
FORMING SOLID SOLUTIONS
William M. Goldberger, Columbus, Ohio, assignor, by mesne assignments, to The Battelle Development Corporation, Columbus, Ohio, a corporation of Delaware
Filed Apr. 20, 1965, Ser. No. 449,469
Int. Cl. B01d 9/04
U.S. Cl. 62—58          7 Claims

ABSTRACT OF THE DISCLOSURE

Materials forming solid solutions are separated by introducing them into a bed of inert particles that form a moving column, causing liquids within the bed to flow countercurrently to the flow of said particulate material and providing temperatures and liquid-solid fugacities within the column disposed to effect solidification of at least a portion of the substance on the inert particulate material as a solid phase leaving a remainder liquid phase so that solid and liquid phases of the material exist throughout the column of particles in direct contact with one another and said solid and liquid phases are enriched in one component upstream from the point of introduction of said material into said bed of particles and in another component downstream from the point of introduction of said material into said bed of particles.

---

This invention relates to methods for separation of mixtures by countercurrent solidification. More particularly, it relates to a method of separation by countercurrent contact of a liquid phase with a thin film of solid phase that is ever richer in one component.

Fractional solidification, which term includes within its scope fractional freezing or fractional crystallization, is well known as a method of separation and purification. The method is made operable by the fact that the tendencies for individual components within a single solid phase to dissolve in a solvent will differ and that the melting tendencies of individual components within a single solid phase will differ. In addition, both the solubility and melting properties are dependent functions of the composition of the solid phase provided that the solid phase is a homogeneous solid solution and not merely a physical mixture of different solids. For saturated liquid solutions in which the solubility of the solutes in a solvent decreases with decreasing temperature, the solutes can be crystallized from liquid solution simply by lowering the temperature of the solution. Substances which do not exhibit appreciable solubility in the solid state can be crystallized or frozen independently from a liquid solution containing these substances merely by controlling the crystallization or freezing temperature of the liquid solution. Thus, separation of such substances is relatively simple and requires only one or two stages of freezing to obtain an effective separation.

Although theoretical advantages of a fractional solidification process for separation when compared to alternate separation processes such as distillation and extraction have been recognized in many areas, commercial application has been hampered by lack of a process for fractional solidification that can be carried out conveniently on a continuous and countercurrent basis. Recent emphasis in the art of fractional solidification has been centered on the zone refining process. In this process, a heat zone moving from one end of a column of solid material to the other end causes a molten zone to traverse the length of the material by repeated steps of melting and freezing. The movement of the liquid-solid interfaces thus obtained causes impurities more soluble in the liquid phase than in the solid phase to move in the direction of the moving heat zone. A disadvantage of zone refining is that it is not well suited to large scale industrial operations requiring continuous processing methods. Because many substances do form solid solutions wherein their relative concentrations differ from that contained in the liquid in equilibrium with it, there is a theoretical basis for obtaining purification by fractional solidification. This is conditioned on the requirement of establishing contact between solid and liquid phases that differ in their relative compositions from that of the thermodynamic phase equilibrium. Useful application of theory has been difficult because of heretofore practical problems of maintaining contact of solid and liquid phases to provide adequate counterflow of the phases and to increase the relatively slow rate of transfer of components into and through the solid phase.

Many applications and uses are foreseeable for an efficient method of separation and purification by fractional solidification. These include production of heavy water, purification and separation of inorganic and organic chemicals, pharmaceuticals, and purification of metals and semiconductor materials such as germanium and silicon. In addition to separation of substances that form solid solutions, the method of this process is also useful for countercurrent freezing and washing operations such as processes for recovering fresh water from sea water.

One of the objects of this invention is to provide a process for separation by fractional solidification.

Another of the objects of this invention is to provide a process wherein repeated solidification and solution are effected in a simple manner.

A still further object of this invention is to provide a process for fractional solidification wherein repeated solidification of a liquid consisting of components to be separated is carried out in a manner that yields for components which are mutually soluble, otherwise known as miscible components, a solidified phase that is a true solution of the components to be separated.

Yet another object of this invention is to provide a process for fractional solidification wherein solidification is carried out in such a manner as to provide only thin films of solid.

An additional object of this invention is to provide a process for fractional solidification wherein countercurrent contact is maintained between the liquid and solid phases.

Still another object of this invention is to provide a process for freezing and washing operations wherein countercurrent contact is maintained between the liquid and solid phases.

Still a further object of this invention is to provide for continuous countercurrent contact of the liquid and solid phases in a process for fractional solidification without the necessity for conveying devices or other mechanically moving parts within the fractionating apparatus.

Another object of this invention is to provide a process for fractional freezing in which liquids are enriched in the lower melting point component that they contain to concentrations exceeding that of the original feed composition by providing constant countercurrent contact of the liquids with a frozen solid phase which contains a greater concentration of the lower melting point component than a solid phase which would be in thermodynamic equilibrium with the liquid at the temperature of the liquid.

Still another object of this invention is to provide a process for fractional freezing in which frozen solids are enriched in the higher melting point component that they contain to concentrations exceeding that of the original feed composition by providing constant countercurrent contact of the frozen solids with liquids which contain less of the lower melting point components than a liquid in thermodyamic equilibrium with the solid at the temperature of the solid.

Another of the objects of this invention is to provide a process for fractional crystallization in which liquids are enriched in the more soluble component that they contain to concentrations exceeding that of the original feed composition by providing constant countercurrent contact of the liquids with a crystallized solid phase which contains a greater concentration of the more soluble component than a solid phase which would be in thermodynamic equilibrium with the liquid at the temperature of the liquid.

A still further object of this invention is to provide a process for fractional crystallization in which crystallized solids are enriched in the less soluble component that they contain to concentrations exceeding that of the original feed composition by providing constant countercurrent contact of the crystallized solids with liquids which contain less of the more soluble components than a liquid in thermodynamic equilibrium with the solid at the temperature of the solid.

Various other objects and advantages will appear from the following description of several embodiments of the invention, and the novel features will be particularly pointed out hereinafter in connection with the appended claims.

Figure 1:
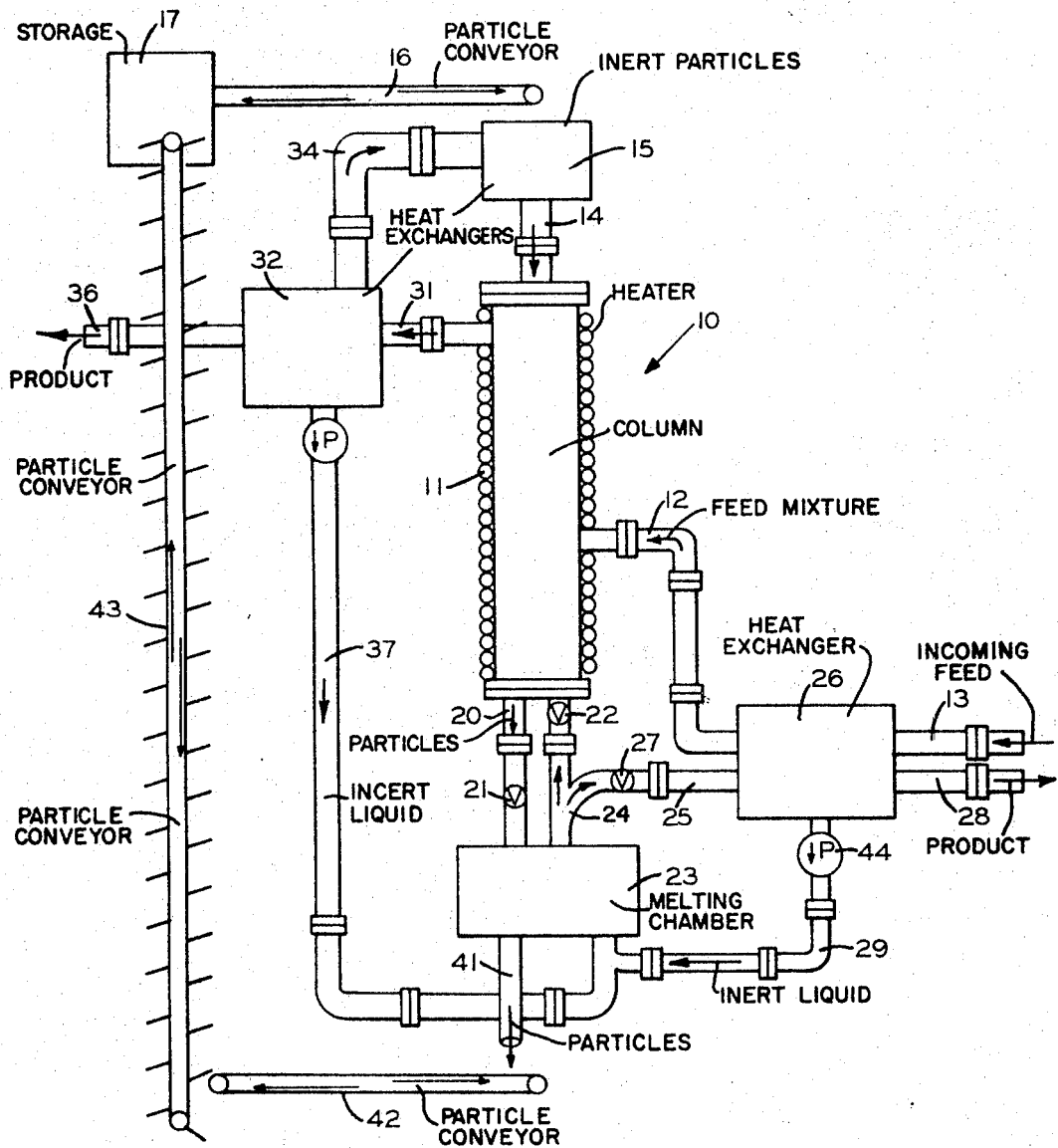
FIG. 1 illustrates schematically an apparatus for carrying out the method of this process.

Briefly described, the process of this invention includes in its scope the introduction of a separable mixture of substances added in the form of liquid, mixed liquid and solid, or as solid to a moving bed of closely packed solid particulate material. Provision is made to maintain the temperature within the bed so that all locations within the bed contain solid and liquid phases of the substances of the feed mixture. Means are also provided to flow the liquid phase countercurrent to the moving bed of solids. The fractionation which occurs within the process of this invention is a result of relative movement of liquid and solid phases allowing differences in concentration to exist between liquid and solid in contact within the bed which differ from those concentrations dictated by thermodynamic equilibrium of those phases at corresponding temperature. This difference in concentration between phases from that of phases in equilibrium provides the potential or "driving force" for the separation process. Two basic methods can be used to obtain fractional solidification. The choice of method would depend on the system of interest.

In one method of fractional solidification, namely fractional freezing a longitudinal temperature gradient is imposed along the bed so that the one end of the bed is maintained cooler than the other end. This temperature gradient results in a longitudinal gradient of composition within the bed that is established by the difference in the corresponding melting points of the components involved and results in a preferential movement of the lower melting components of the liquid into the cooler end of the bed. Because a temperature gradient is applied along regions of the bed in which continual steps of freezing-melting occur, this method although within the scope of the term fractional solidification is more explicitly referred to as fractional freezing.

In a second method of countercurrent separation, namely fractional crystallization, an inert solvent liquid is introdhced within the bed. The liquid solvent is wholly soluble with the liquid solution and does not solidify in any part of the apparatus or at any time during the operation. The liquid solvent, however, is not miscible in the solid formed during the solidification process. In this latter mode of operation, no specific temperature gradient is required and the change in temperature with distance from one extreme of the separation zone to the other may be chosen arbitrarily. Thus it is possible to make a separation under isothermal conditions when using a nonsolidifying solvent liquid. The use of a solvent liquid allows a gradient of composition to be achieved within the bed even at constant temperature. The composition gradient is dictated by the corresponding solubilities of the components involved and results in a preferential movement of the more soluble components of the liquid into one region of the bed thus enriching the concentration of those components. This mode of operation is termed fractional crystallization and it is similar to fractional freezing as a fractional solidfication process that is made operable by the fact that the physical characteristics of individual components which combine to form a single solid phase may differ. The use of a solvent liquid to cause a continual change of composition of solid and liquid phases by virtue of changes in solubility and resulting crystallization from solution makes the term fractional crystallization more applicable to the latter mode of operation.

In either mode of operation, the liquid is introduced under conditions such that solidification of the mixture occurs as a thin film on the surfaces of the particulate material. The thin film deposit of the precipitated solid is maintained by using a sufficient amount of inert solid in proportion to the precipitated solid phase. The thin film allows fairly rapid diffusion of components through the deposit and thereby promotes a near equilibrium condition between the phases and facilitates repeated near equilibrium steps of fractional solidification. When components which form solid solutions are employed, the thin film is a homogeneous phase that is a true solid solution of the components.

In the case where no solvent is added and the separation is to effected by fractional freezing, a portion of the material introduced to the bed is either in liquid form or partially melts and does not freeze immediately, but flows against inert particles which are coated with a solid that is richer in the lower melting point component. The continuous action of liquid flowing countercurrently to the coated particulate material results in an excess of the lower melting point component in the regions of the bed that are in proximity to incoming particulate material. In the portions of the bed remote from incoming particulate material, the moving coated particles become more and more depleted of the lower melting point component. Thus the solid becomes progressively richer in the higher melting point component in the region of the bed remote from incoming paticulate material. At the part of the fractionating apparatus in proximity to incoming particulate material, a mixture can be withdrawn that is substantially richer in the lower melting point component than was the feed mixture. At the part of the fractionating apparatus remote from incoming particulate material, a mixture can be withdrawn that is substantially richer in the higher melting point component than was the feed mixture.

In the embodiment of the invention illustrated in FIG. 1, the fractionating apparatus comprises generally a simple column 10 of circular cross section. A heater may be provided where necessary as shown at 11.

The components to be separated enter the column generally represented at 10 through feed pipe 12. These components may be in liquid form, although a solid as well as a mixture comprising liquid and solid may be fed. Particulate solids are carried from storage area 17 by conveyor 16 and enter column 10 through particulate solids feed pipe 14. Heat exchanger 15 may be used to cool or heat the solid particulate material. The particulate solids are fed by gravity through column 10. The downward movement of the mass of particulate solids is controlled by valving device 21 located in particulate solids drain line 20. The thin film of solid on the particulate material is melted in a chamber generally represented at 23. The clean particulate solids pass out of chamber 23 through exit 41 and are carried by convenient means such as belts 42 and 43 to storage area 17 where they can be used again. The liquid from chamber 23 exits through pipe 24 and may be directed through pipe 25 by valve 27 to extract heat from incoming feed entering heat exchanger 26 at 13. A portion of the liquid in chamber 23 may also be directed back into the column by valves 22 and 27 through pipe 24. Product material is removed through exit 28 at heat exchanger 26. The mixture of fractionated components at the upper section of the column are continuously removed through pipe 31. A portion of the liquid removed at 31 may be recycled through pipe 34 to freeze on solid particulate material entering the column through 15 and entry pipe 14. The remaining product material may pass through exit 36.

Figure 2:
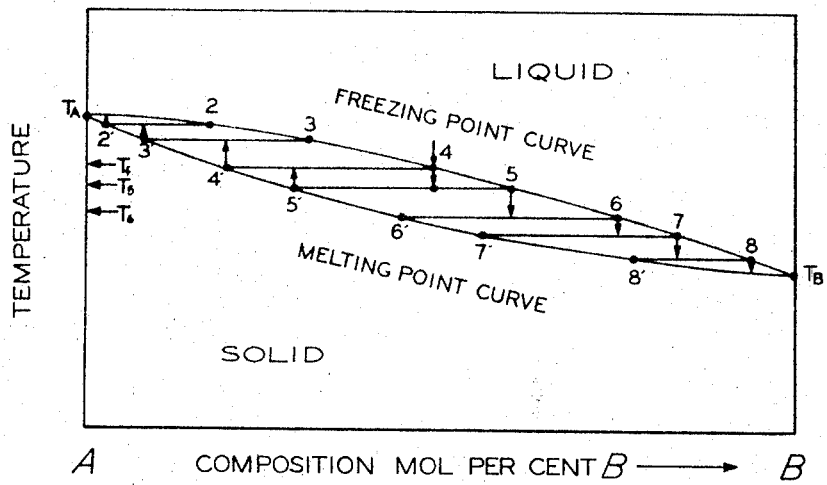
FIG. 2 shows a phase diagram of a simple solid solution in order to illustrate the operation of an embodiment of the process.

An embodiment of the method of this process wherein a temperature gradient is imposed on a moving bed to promote fractional freezing of the liquid phase can be described by considering the separation of a liquid containing approximately equal amounts of two components. Perhaps the simplest case is that in which the binary system under consideration is wholly miscible in both the liquid and solid phases throughout the entire composition range between one pure component and the other. A temperature-composition diagram for this system showing phases that are present at solid-liquid equilibrium is shown in FIG. 2. A binary liquid containing approximately equal mol per cent of A and B where B is the lower melting point component is to be separated and enters the fractionating apparatus represented by the column 10 of FIG. 1 approximately midway between top and bottom. Generally, separation efficiency is best when the feed material is made to enter the column at a location where the composition of the material within the column most corresponds to the composition of the feed. By maintaining the temperature in the column at the feed point location at a temperature below the freezing point of the feed liquid, a portion of the feed liquid will freeze on the solid inert particles in the vicinity of the feed entry point. Suppose the freezing point of the feed, $T_f$, corresponds to the temperature of point 4 on FIG. 2. If the temperature within the column is lower than $T_f$, say, $T_5$ of FIG. 2, a portion of the feed liquid freezes to form a thin film of solid on the surface of the solid particulate material. The solids frozen from the incoming feed at this point will have the composition corresponding to point 5' and the remaining liquid from the feed that is in contact with this solid has the composition corresponding to point 5. Liquid is constantly displaced upwardly in counterflow to the downwardly moving solids and is thereby forced upwardly into the cooler reigons of the column and is again partially frozen. This is illustrated by the step-wise path from temperature $T_5$ to $T_6$ of FIG. 2. This results in further enrichment of the liquid in the lower melting point component B to a composition corresponding to that of point 6 in FIG. 2. This enrichment of the liquid is continuous in regions progressively above the feed location by virtue of continuous partial freezing of liquid as it progresses into the cooler regions.

Similarly, the behavior of the frozen portion of the feed as it progresses below the feed location into the higher temperature regions of the column is shown by the stepwise path in the upper portion of FIG. 2.

The stepwise path of composition and temperature change of liquid and solids as shown in FIG. 2 is grossly exaggerated for purposes of explanation. Actually, the large surface area presented by the many small inert particles means that at each point of intimate contact of the liquid with the solid, the liquid can assume an almost identical temperature to that of the solids in its immediate vicinity. Thus, at any elevation within the column, the liquid and the frozen solids that it contacts are almost in thermal equilibrium and the compositional change represented by a single step in the diagram of FIG. 2 becomes infinitesimal. A continuous and gradual change in both temperature and composition results rather than a gross stepwise change. Thus, liquid and solid compositions closely follow the freezing point and melting point curves of FIG. 2 as the solids and liquids flow in opposite directions within the column.

Because the liquid freezes as a very thin film coating of solid on the solid particulate material under almost equilibrium conditions, the frozen phase is a true solid solution of the components for a soluble system. The large surface area presented by the particles on which the thin film forms and the rapidity with which thermal equilibrium can be approached at any point within the column permits the operation of the process to be depicted on the equilibrium diagram of FIG. 2.

It should be recognized too that to a large degree, the action of freezing and melting within the column is essentially adiabatic. That is, there is no large amount of heat transferred through the walls of the column either to or from the surroundings. Thus, when a portion of the liquid in the column freezes onto the inert particles, the heat of fusion that is liberated serves to melt the lower melting component previously frozen in the film on the particles. Thus, similar to distillation, a component condensing from the fluid serves to liberate the other component into the solution in a relative amount that is established by their relative latent heats and the heat losses from the column. It is important to note, also, that the flow of solids downward and the flow of liquid upward are both continuous and uninterrupted at any time during the operation. Because of this if a temperature difference is maintained at the extreme ends of the column, the temperature from top to bottom within the column changes very gradually from a lower to a higher temperature value. It is evident from the freezing characteristics of liquids at their freezing point that the composition of the liquid become increasingly richer in the lower melting point component as the liquid rises upward in the column. There is a corresponding increase in the relative amount of the lower melting point component in the frozen solid film at higher elevations within the column. The net effect of this action in the section of the column above the feed point is that the rising stream of saturated liquid at its freezing point is continually being brought into contact with frozen solids that are richer in lower melting point component because these solids are moving downward from the lower temperature regions where the composition of the lower melting point component is greater. This action in the section of the column above the feed location is exactly analogous to the action in the enriching section of a distillation column, and thus a similar refluxing or enriching action is obtained. Thus, the liquid in the column above the feed location is richer in the lower melting point component than was the feed mixture. A similar action occurs in the section below the feed location, and this section of the fractional freezer is analogous to the stripping section of the usual distillation column. In the section below the feed location, the rising stream of liquid from the higher temperature regions causes melting of the lower melting point component contained in the coating of solid phase on the particulate material. Thus, the frozen solid moving downward in the stripping section becomes richer and richer in the higher melting point solid and the temperature-composition relation is approximately that of the melting point curve of FIG. 2. The higher melting component can therefore be drawn from the bottom of the section in greater purity than it was in the feed mixture. In this manner, the components of the feed can be separated in a continuous and countercurrent manner.

The efficiency of the processing can be enhanced by the introduction of reflux at the top and bottom section of the column. At the top of the column, a portion of the lower melting point component can be frozen on the cold particulate material entering the column. This provides a thin film of solid phase rich in the lower melting point component to contact liquid similarly richer in the lower melting point component. At the bottom of the column, a portion of the emerging frozen solid can be melted to provide a liquid rich in the higher melting point component to contact the descending particles and strip them of the lower melting point component as they move countercurrently to the liquid in the hotter regions of the column.

In another embodiment of the process, fractionation and separation of components can be carried out without a temperature gradient. This separation is made possible by use of a nonsolidifying inert solvent liquid to promote the necessary countercurrent contact of solid and liquid phases over a large surface area to achieve approximately equilibrium conditions between phases. Liquid entering the fractionating apparatus represented by the column 10 of FIG. 1 at the feed point is carried upwardly by a nonsolidfying inert solvent liquid. Carrier solvent enters the column 10 of FIG. 1 through pipe 24 by means of valve 22. A small flow of carrier solvent can also be used for introducing the feed at 12. Any solvent liquid used to carry product to heat exchanger 26 can be separated from product at heat exchanger 26 and returned to column 10 by means of pump 44 and return pipe 29 joining pipe 37 which enters chamber 23. Carrier solvent carried off at 31 with the mixture of components undergoing fractionation may be recycled and pumped from chamber 32 through pipe 37 entering chamber 23. The distribution along the column of the temperatures of the moving solid particles can be fixed arbitrarily. A particular case of this is the case in which the column is isothermal, that is to say the whole column is at the same temperature. Generally the highest possible temperature is chosen because the mobility of atoms, ions and molecules in the solid phase increases rapidly with temperature.

When using a solvent liquid to enhance the separation of two components, there results a three component system. The total flow rate of liquid is maintained essentially constant. The chemical potentials of the individual components, however, can be varied as can the sum of these chemical potentials because they are not fixed by temperature and pressure as is the case in the hereinabove described embodiment of fractional freezing. The operative temperature or temperature gradient in this case can be chosen arbitrarily. In actual operation under isothermal conditions, feed is carried into the column under conditions of composition and temperature such that a thin film of binary solid crystallizes from the components of the binary liquid carried by a nonsolidifying inert solvent liquid. For the separation of binary component such as those previously discussed and depicted in FIG. 2, the solid crystallized from a liquid is enriched in the less soluble component whereas the remaining liquid is enriched in the more soluble component. The enriched liquid thus formed is carried upwardly by the solvent liquid in counterflow to solid similarly formed at higher elevations in the column and there is further crystallization and solution with enrichment of the liquid in the more soluble component. Liquid continually enriched in the more soluble component is carried by the nonsolidifying inert solvent liquid in counterflow to a thin coating of crystallized solid on the downwardly moving particulate material which solid is ever depleted in the more soluble component. In the portion of the moving bed closest to entering particulate material, liquid enriched in the more soluble component contacts the solid that is present as a thin film on the surface of the particulate material and because the solid film was formed at a higher elevation in the column, it has a greater concentration of the more soluble component than would a solid phase in equilibrium with the liquid at the temperature of the liquid. The solid, therefore, tends to equilibrate with the liquid composition and thus preferentially rejects the more soluble component as the less soluble component tends to crystallize from the liquid. At the portion of the column closest to incoming particulate material, liquid carried by the solvent liquid tending to equilibrate with the solid is substantially richer in the more soluble component. The liquid carried upwardly is continually enriched in the more soluble component by the repeated steps of crystallization solution. Above the feed entry point, the column can be described as containing both solid and liquid phases richer in the more soluble component but the counterflow is such that there is continual enrichment of the rising liquid and continual depletion of downwardly moving crystallized solid in the more soluble component.

In the portion of the column below the feed entry point, the thin film of solid crystallized on the particulate material is depleted in the more soluble component by contact with a liquid phase which contains less of the more soluble component than a liquid in thermal equilibrium with the solid at the temperature of the solid. The solid in tending to equilibrate with the liquid continually rejects the more soluble component to the liquid. The thin coating on the solid particles moving downwardly countercurrently to the rising liquid is being continually enriched in the less soluble component by repeated steps of crystallization and solution.

A portion of the enriched liquid in the vicinity of the entering particulate material may be solidified as a thin coating on the particulate material entering the system so as to provide a refluxing action. This gives improved efficiency for the processing by continual contact of solid becoming less rich in the more soluble component with a liquid phase becoming continually enriched in the more soluble component. At the base of the fractionation column a dissolver unit can steadily provide reflux of liquid rich in the less soluble component. The liquid carried upwardly by a solvent liquid contacts the solid particles coated with solid to remove the more soluble component from the solid and the continual steps of crystallization and solution take place, so that the net effect is to continually increase the relative amount of the more soluble component in the liquid rising in the column and increase the relative amount of the less soluble component descending on the downwardly moving solid particles.

It is important to note that the isothermal process is simply one case of the more general process in which the distribution of temperature along the column may be chosen arbitrarily. The ability to select a desired gradient of temperature or operate isothermally is made workable by the use of a solvent liquid. In this way, countercurrent movement is achieved of a liquid continually depleted of the less soluble component by the solvent liquid causing it to be brought into contact with a solid ever richer in the more soluble component. The feature of countercurrent movement is combined together with the previously described advantages that can be obtained from the large surface area of the thin film compositions presented by the downwardly moving particles.

For systems of components forming solid solutions, the ease of separation depends on the partition or segregation coefficient (ratio of the solubilities of one component in the liquid and in the solid phases). When the segregation coefficient approaches unity, separation is more difficult. Because of the vast number of fractionating stages that may be provided by the process of this invention, the invention is particularly suited for those systems which exhibit segregation coefficients approaching unity.

The method of this process can be used for solid solutions comprising any number of soluble components. Solutions of components would be withdrawn from one portion of the column and pure component from a second portion of the column. The solution of components thus withdrawn would merely be made to enter another fractionating column for subsequent separation of another pure component by a similar operation. Thus, for a system of $n$ soluble components, $n-1$ columns would be provided.

In modification of this process, a batch-type separation can be accomplished similar in concept to batch-wise distillation. In this case, a fixed amount of components is introduced to the column and fractionated. A constant flow of the inert solids is provided and product streams can be drawn intermittently or continuously during the fractionation. Because no component is added, the compositions in both the liquid and solid at any location in the column will change with time. This type of batch-wise separation can be accomplished with a solvent carrier liquid or without a solvent carrier liquid if a temperature gradient is maintained.

For purposes of experiment, the fractionating apparatus can also be operated at total reflux of the components in the feed mixture, i.e., no withdrawal from the system of those components undergoing fractionation. For fractional crystallization, an inert solvent liquid can be made to move through the apparatus without depleting the inventory of components. Similarly, during fractional freezing a total reflux may be provided to prevent depletion.

There are a number of process conditions that will affect the operability of the process and the manner of the solidification and thus the degree of separation that is achieved within the apparatus. These factors include the relative amount of particulate material that is circulated through the apparatus with respect to the amount of feed material to be fractionated. In addition, the size of the particulate material is important. If a temperature gradient is used, without use of an inert solvent liquid, the degree of separation will be limited by the temperature at the extreme ends of the separation column. For isothermal operations, solvent liquid flow rates should be selected to match the operating conditions and the separation will depend on the amount of product drawn relative to that refluxed back to the column. Rates of diffusion are increased at higher temperature and generally it is best to operate at as high a temperature as is practicable with consideration to the melting points and vapor pressures of the components involved. It was observed in actual operations that there is a tendency for the solid particles to adhere to each other when they become coated. This action can prevent the desired free flow of the solids unless suitable design conditions are used. The tendency for the solids to bridge after receiving a coating as described can be eliminated by increasing the relative amount of the particulate material with respect to the solidified components held within the column. Also, use of a large diameter particulate material reduces the adhesion effect. Use of a vibrating action in some cases is sufficient to insure a free-flowing action.

The particulate material which moves as a closely packed bed may comprise one of the components to be separated. For example, in the separation of two components that combine to form a solid solution, particulate material comprising the higher melting point component or the component less soluble in the liquid can be used. A particulate material that is nonmelting and inert such as sand or glass beads can provide a satisfactory surface for separation and removal of components from the separation system.

Example 1

An experiment was made to separate para-dibromobenzene ($pC_6H_4Br_2$) and para-dichlorobenzene ($pC_6H_4Cl_2$)

under a condition of total reflux (as opposed to continuous feed and withdrawal of all components) in a column of the type shown in FIG. 1. A column of glass tube having a diameter of 30.0 mm. was charged with a liquid solution of 50 mol percent of $pC_6H_4Br_2$ and 50 mol percent of $pC_6H_4Cl_2$ at a temperature of 90° C. Glass spheres having an average diameter of 0.5 mm. were fed to the column so that the level of the packed bed of solids was about 1-inch below the top of the column and liquid filling the insterstices within the bed rose to a level near to the top of the column. The glass spheres were moved downwardly through the column at a rate of about 0.5 cm./min. A temperature gradient varying from a lower limit of 55° C. at the top of the column to 85° C. at the bottom of column was adjusted through variable power transformers connected to heating coils wrapped around the column. As the inert solids containing the adhering solid films were carried to the bottom of the column, the solid films were melted from the glass spheres. Provision was made to cause this melted material to remain in the column to insure total reflux during operation. Liquid samples were taken periodically from two different elevations in the column and analyzed by determination of freezing points. The separation achieved at various points in the column is shown below:

| Sampling location: | Molar composition of sample, percent $pC_6H_4Br_2$ |
|---|---|
| Top | 50.0 |
| Middle | 57.3 |
| Bottom | 64.0 |

It is apparent from these data that enrichment in the higher freezing point $pC_6H_4Br_2$ occurred toward the bottom of the column by virtue of the refluxing and stripping action obtained in the column.

Example 2

An experiment was made to determine the change in composition at the sampling points with time in the column equipped as previously described in Example 1. The composition of the liquid feed solution was 52.1 mol percent of $pC_6H_4Br_2$ and 47.9 mol percent of $pC_6H_4Cl_2$. Conditions of operation were the same as those described for Example 1. The separation achieved with time is shown below:

| Distance Below Surface of Liquid, Inches | Molar Composition, Percent $pC_6H_4Br_2$; Time, Minutes | | | | |
|---|---|---|---|---|---|
| | 0 | 40 | 120 | 150 | 180 |
| 1 | 52.1 | — | 47.5 | 47.0 | 40.0 |
| 8 | 52.1 | 56.0 | 54.0 | 52.0 | 50.75 |
| 18 | 52.1 | 56.0 | 54.0 | 54.0 | 53.5 |

The experiment established that significant separation of components could be achieved as the column approached steady operation.

The preceding discussion has emphasized the separation of solutions because of their basically simple nature and because for components that are wholly miscible and that form a continuous series of solid solutions virtually complete separation can be achieved. The fact that such desirable results for separating two or more components from each other can be obtained by solidification into solid solutions within the column does not limit the process to separable components that are wholly miscible and that form a continuous series of solid solutions. For instance, in the case of components displaying partial solid solubility, a eutectic composition may represent one compositional limit of separation that can be achieved by a single operation. In other words, pure component can be removed at one end of the separation column and liquid of eutectic composition at the other end.

Separation can still be achieved in another embodiment by the prescribed method of the disclosed embodiments for components that do not form solid solutions. The column operation is entirely the same in this case; however, the coating of solids that form on the inert particles consists of two distinct phases rather than a single homogeneous solid phase of the two or more components. The column, instead of fractionating the components as such, can be used to strip the lower melting point components away from the higher melting point component thus providing a high purity of the higher melting point component at one end of the column but a mixture of components at the other end. Compounds which form solid solution can be fractionated in two ways by the method of this invention. This includes separation with a solvent liquid or without a solvent liquid if a temperature gradient is maintained. Compounds which form distinct solid phases rather than solid solutions can be fractionated only if a temperature gradient is maintained (although a solvent liquid may be used together with the temperature gradient). This is because the composition of a liquid in thermodynamic equilibrium with a solid solution varies with the composition of the solid solution even under isothermal conditions whereas the composition of a liquid in equilibrium with a simple mixture of the solids is unaffected by the over-all composition of the solids. In the latter case, the composition is affected mainly by temperature, but is not affected by the composition of the solid mixture.

An important application of the method of this process to components that do not form solid solutions relates to a separation method for sea water. The phase diagram for the ice-salt system shows a eutectic at about 23 percent of salt with no solid solubility of salt in ice. Thus, the process is not fractional in that the composition of the solid does not change as it flows countercurrently to liquid containing decreasing amounts of salt. The solid solidifies on the moving closely packed particulate material as pure ice. The process can be more accurately described as a freezing and washing operation wherein countercurrent contact is maintained.

Figure 3:
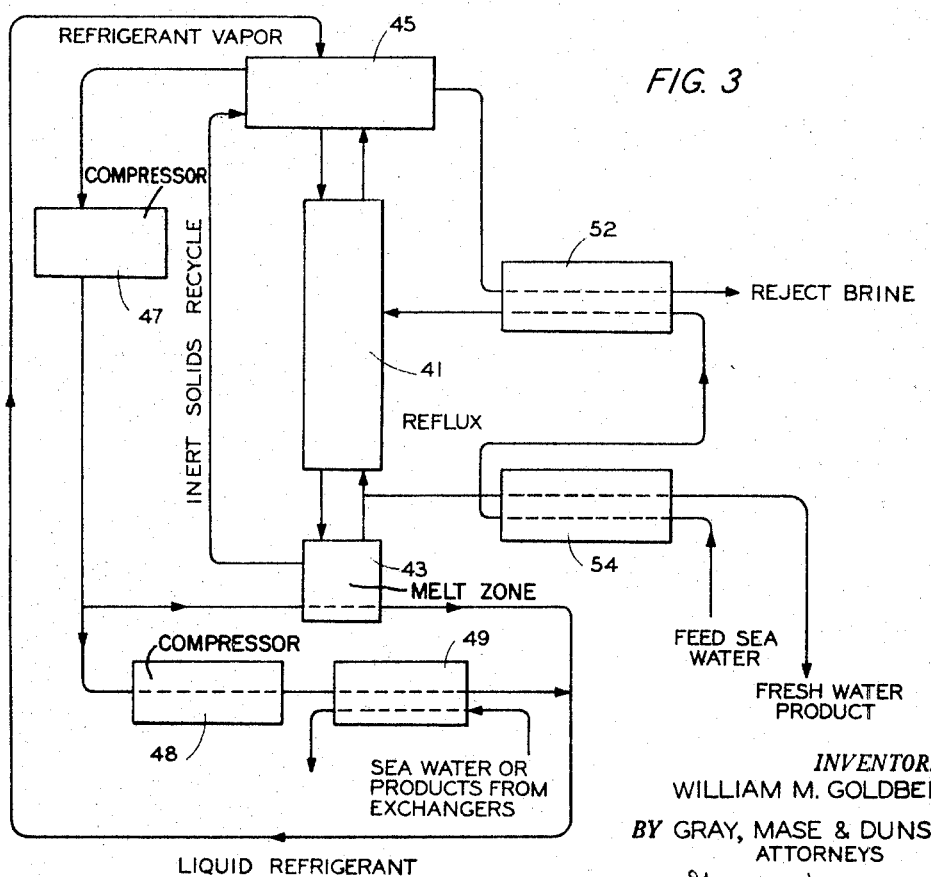
FIG. 3 illustrates diagrammatically an apparatus for carrying out a further embodiment of the process. The diagrammatic illustration is shown as the process is carried out on known types of equipment.

In a typical operation employing the method of this process, sea water is fed to separation column 41 of FIG. 3. The temperature in the column at the feed point is maintained lower than the freezing point of sea water. The water cools after entry, reaches its freezing point, and deposits ice onto the surface of closely packed downwardly moving particulate material. By using a sufficient amount of the particulate material in proportion to the precipitated ice, it is possible to obtain a thin-film deposit of the precipitate rather than a bulk-deposited form. The initial freezing of ice increases the salt concentration of the remaining liquid and its freezing point is lowered below that of incoming sea water. Because temperature within separating column 41 decreases with column height, sea water continues to freeze and deposit ice as it rises in the column. The concentration of salt in the liquid increases with column height until the liquid flows from the brine discharge port at the top of separation column 41. The reject brine can be used to extract heat from incoming sea water at heat exchanger 52. Particulate material coated with a thin film of ice continues to move downwardly and is withdrawn from the bottom of separation column 41 and enters melter 43 where the coating of ice is removed. The pure-water product drawn from melter 43 can be used to extract heat from incoming sea water at heat exchanger 54. A portion of the fresh water is returned as reflux at the bottom of separation column 41. The reflux rises upwardly and extracts salt by virtue of continuous countercurrent contact with the downwardly moving ice. Solids leaving melter 43 are conveyed to refrigeration chamber 45. Heat is removed from the solid particulate material in refrigeration chamber 45 by direct contact refrigeration or by conventional closed-cycle refrigeration. Removal of heat from the solids can be done by direct contact refrigeration using a refrigerant such as propane. Liquid propane under pressure developed by suitable compressors 47 and 48 is expanded in refrigeration chamber 45. The flash adiabatic vaporization reduces the temperature of the particulate material to the desired level of temperature slightly below the freezing point of the enriched brine that leaves from the top of separation column 41. The cooled solids serve as the heat sink for the latent heat of fusion of the freezing process. Refrigerant vaporized at refrigeration chamber 45 passes to compressor 47. The refrigerant may then be condensed at melter 43 and returned directly to refrigeration chamber 45. A portion of the refrigerant vapor emerging from compressor 47 may be liquified at compressor 48 and condenser 49. Sea water or products from heat exchangers 52 and 54 may be used to condense vapor emerging from compressor 48. Separation column 41 is provided with insulation to enable essentially adiabatic operation, and the downward movement of the inert solids causes the desired longitudinal temperature gradient within the column.

The continuous countercurrent freezing process as hereinabove described employs the principle of multiple stages of freezing and subsequent melting, but incorporates the multistage operation in a single column apparatus. This provides a distinct advantage over single-stage freezing. Multistage operation allows salt concentrations in the waste brine to approach the limit of the eutectic, or about 23 percent of salt. In a single-stage freezing process such high salt concentrations would result in occluded salt amounting to at least 1 percent of the ice and a high recycle of fresh water would be required to wash the ice free of occluded salt.

The novel features of this invention as disclosed by the examples and disclosures hereinabove set forth have been generally illustrated by a process characterized by the ability to achieve separation by solidification by continuous countercurrent contact of a liquid ever depleted in one component with a thin film of solid phase, that may be a solid solution, ever richer in another component, the thin film of solid phase allowing rapid diffusion in and through the solid phase and close approach to equilibrium between liquid and solid.

The above examples are intended to be illustrative of applicant's process but are not intended to be limiting thereof. Many additional applications and combinations will be immediately obvious to those skilled in the art.

One advantage of this invention is that a process is provided wherein continuous fractional solidification may be carried out without the use of moving parts within the fractionater column.

Another advantage of this invention is that a process is provided wherein separation by fractional solidification is purely physical as opposed to chemical.

Still another advantage of this invention is that a process is provided for fractional crystallization at constant temperature.

Yet another advantage of this invention is that a process is provided for fractional solidification wherein components can be recovered in almost pure form.

An additional advantage of this invention is that a process is provided for fractional solidification wherein maximum thermal efficiency is obtained by convenient countercurrent contact.

Still another advantage of this invention is that a process is provided for fractional solidification wherein multistage operation is obtained within a single column-type apparatus and is carried out in a continuous operation suited to automated operation and large-scale production.

Yet another advantage of this invention is that a process is provided for fractional solidification wherein a large number of fractionating stages are provided to give practical separation of soluble components having a segregation coefficient approaching unity.

Still another advantage of this invention is that a process is provided for fractional solidification wherein direct contact (open-cycle) refrigeration can be used without the necessity of adjusting operating conditions of temperature and pressure for the particular refrigerant and without the necessity of using refrigerants that are highly immiscible and nonreactive with the liquid phase.

Yet another advantage of this invention is that a process is provided by fractional freezing wherein freezing occurs on an intermediate inert solid surface which acts as a heat sink during freezing.

A still further advantage of this invention is that a process is provided for separation by solidification wherein countercurrent freezing and washing is accomplished to provide an uncontaminated pure component.

Many other uses and advantages for applicant's process will be apparent to those having a need for separating liquids and solids in a continuous manner.

It will be apparent that new and useful methods for separation by solidification have been described. Although several preferred embodiments of the invention have been described, it is apparent that modifications may be made therein by those skilled in the art. For example, in the embodiments hereinabove described closely packed particulate material moves downwardly in a vertical column. The scope of the invention would necessarily include upward movement in a vertical plane or horizontal movement of a bed of closely packed particulate material. In either case, liquid would flow countercurrently to the above-mentioned moving bed. Such modifications may be made without departing from the spirit or scope of the invention, as is set forth in the appended claims.

What is claimed is:

1. A process for enriching a substance composed of a mixture of separable liquefiable materials forming solid solutions comprising:
   (a) introducing said substance into a confined compact moving bed of substantially nonmelting insoluble inert particulate materials within a colume intermediate the effective ends of the column;
   (b) causing liquids within the column to flow countercurrently to the flow of said particulate material;
   (c) providing temperatures and liquid-solid fugacities within the column disposed to effect solidification of at least a portion of the substance on the inert particulate material as a solid phase leaving a remaining liquid phase, the solid and liquid phases of said substance being in constant and direct contact with one another, said liquid phase being at its solidification point throughout said column, said temperatures and fugacities being further disposed to provide solid and liquid phases respectively, relatively enriched in the higher melting components of said substance in the region of the column displaced from the point of introduction in the downstream flow of the bed of particulate material in said column and solid and liquid phases respectively, relatively enriched in the lower melting components of said substance in a region of the column displaced from the point of introduction in the upstream direction of flow of the bed of particulate material in said column; and
   (d) removing substance enriched in said higher melting components at at least one point displaced in the said downstream direction of flow of said column from said point of introduction and removing substance enriched in said lower melting components at at least one point displaced in the said upstream direction of flow of said column from said point of introduction.

2. The method of claim 1 wherein said substance is introduced into said column continuously.

3. The method of claim 1 wherein said temperature in said column is varied to form a gradient being highest in the downstream direction of flow of said column and lowest in the upstream direction of flow of said column so as to effect said enriched phases through countercurrent fractional freezing.

4. The method of claim 1 wherein an inert solvent liquid that is wholly soluble with said liquid phase, immiscible in the solid phase and which has a freezing temperature disposed to prevent its solidification within said column is caused to flow countercurrently through said column so as to cause said liquid phase to flow countercurrently.

5. The method of claim 1 wherein said substance contains at least two components capable of forming solid solutions and at least one of these being among the lower melting components and at least one being among the higher melting components.

6. The method of claim 1 wherein said column is maintained at substantially the same temperature so as to effect said enriched phases through countercurrent fractional crystallization.

7. The method of claim 6 wherein an inert solvent liquid that is wholly soluble with said liquid phase, immiscible with the solid phase and which has a freezing point disposed to avoid solidification in said column is caused to flow countercurently through said column so as to cause said liquid phase to flow countercurrently and effect said enriched phases.

References Cited

UNITED STATES PATENTS

| | | | |
|---|---|---|---|
| 2,731,456 | 1/1956 | Weedman | 62—124 |
| 2,777,888 | 1/1957 | Hoff | 62—123 |
| 2,896,419 | 7/1959 | Thompson | 62—58 |
| 3,170,778 | 2/1965 | Roth | 23—301 |
| 3,251,192 | 5/1966 | Rich et al. | 62—123 |

NORMAN YUDKOFF, Primary Examiner

U.S. Cl. X.R.

23—296, 300; 62—123